C. T. & E. W. HARDING.
AUTOMOBILE LOCK.
APPLICATION FILED MAR. 20, 1915.

1,165,776.

Patented Dec. 28, 1915.

Witnesses
Hugh H. Ott
Jean Burdett

Inventors
Charles T. Harding
Eugene W. Harding
By Lemuel A. Fraser
Attorney

UNITED STATES PATENT OFFICE.

CHARLES TAYLOR HARDING AND EUGENE W. HARDING, OF FAYETTEVILLE, ARKANSAS.

AUTOMOBILE-LOCK.

1,165,776.   Specification of Letters Patent.   Patented Dec. 28, 1915.

Application filed March 20, 1915. Serial No. 15,836.

*To all whom it may concern:*

Be it known that we, CHARLES TAYLOR HARDING and EUGENE W. HARDING, citizens of the United States, residing at Fayetteville, in the county of Washington and State of Arkansas, have invented certain new and useful Improvements in Automobile-Locks, of which the following is a specification.

This invention relates to a locking device especially designed for locking the control pedals of an automobile so as to prevent the automobile from being operated by an unauthorized person.

The primary object of the invention is to provide a locking device that is adapted to be used on automobiles that are controlled by foot pedals, to prevent the fraudulent operation of the same.

A further object of the invention is the provision of an automobile lock which shall be simple, durable, and efficient and which may be manufactured and sold at a comparatively low cost.

With the above and other objects in view the invention consists in the arrangement of parts hereinafter fully described and claimed and as shown in the accompanying drawings in which—

Figure 1:
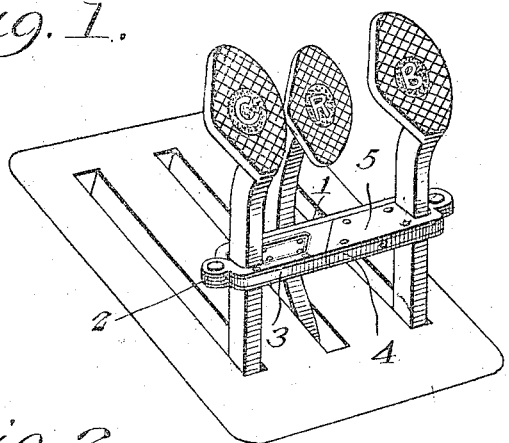
Figure 2:
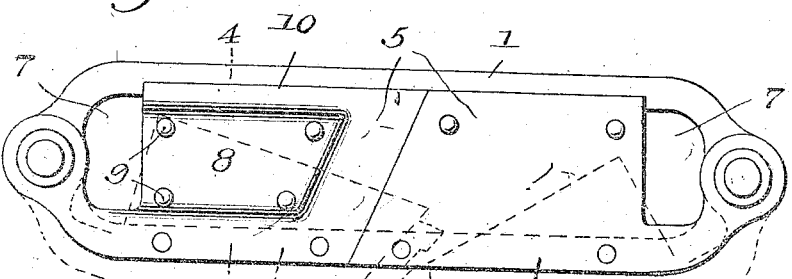
Figure 3:
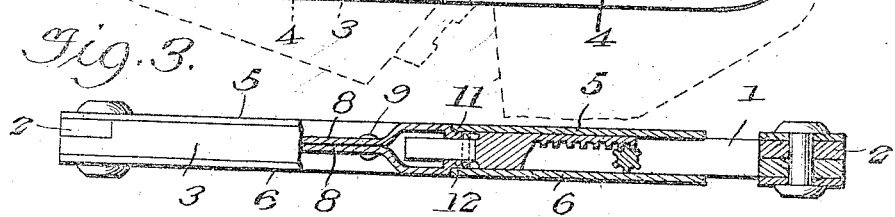
Figure 4:
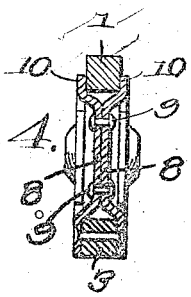
Figure 5:
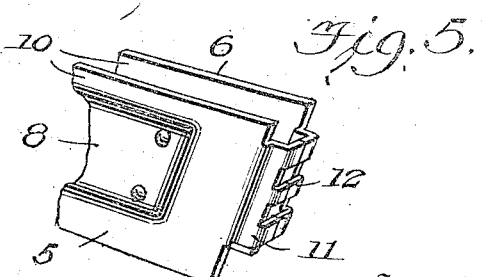

Figure 1 is a perspective view showing the device applied to the pedals of an automobile. Fig. 2 is a plan view showing the device in a closed position, the dotted lines showing the position of the arms when opened. Fig. 3 is an edge view being partly broken away to disclose the locking mechanism. Fig. 4 is a section taken on line 4—4 of Fig. 2. Fig. 5 is a perspective view of the ends of the plates of the bolt receiving arm.

Referring to the drawings by reference numeral 1 designates the main frame constructed of a solid piece of metal and provided at each extremity with laterally extending hinge members 2. Pivotally connected with the main frame by the hinge members are two arms 3 and 4 formed with laterally extending hinge members to coact with the hinge members of the main frame. The free ends of the said arms are angled in the same direction and adapted to lie flush with each other, when the arms are arranged in a closed position.

Carried by and rigidly secured to the upper and lower faces of the pivotally connected arms are sheet metal plates 5 and 6, said plates extending in the direction of the main frame and having their abutting edges angled in the same direction as the ends of the said arms. Elongated openings 7 are provided in the plates of each arm adjacent the hinge members and adapted to contain the shanks of a foot pedal of an automobile when the device is in applied position. Each of the plates of the arm 3 is provided with depressed portions as shown at 8, the said depressed portions having their inner faces flush, and are rigidly secured together by rivets as shown at 9. The inner edges 10 of the said plates are adapted to extend over the edge of the main frame 1 as shown at 10, when the arms are arranged in a closed position. The angled or abutting faces of the plates 5 and 6 of the arm 3 are provided with offset projecting portions as shown at 11 and 12. The said offset portions projecting downwardly and forwardly and upwardly and forwardly respectively of the plates 5 and 6. The said projection portions being offset a distance slightly greater than the thickness of the plates 5 and 6, so as to permit the said projecting portion of the arm 3 to freely pass within the outer edges of the plates 5 and 6 of the arm 4 when the device is arranged in a closed position.

The plates 5 and 6 of the arm 4 are adapted to provide a case for containing a lock mechanism of any desired type. The lock as shown herewith is of the ordinary type and, briefly, comprises a rotary cylinder having formed on its lower extremity a ratchet wheel adapted to engage a serrated face provided on a reduced shank portion of the locking bolt, to operate the same.

It will clearly be seen that to operate the device you open the pivotally connected arm, place the main frame against the under side of the shank of the pedals that you desire to lock, then by bringing the arms 3 and 4 together and by turning the key in the cylinder the locking bolt will slide into the bolt openings provided in the arm 3. Now the invention is in applied position and can only be removed by the owner or by one having a key to the lock.

By the simple but efficient construction of the device anyone is prevented from tampering with the lock mechanism by means of a tool or implement in an attempt to force the lock. This feature is made possible by the peculiar construction of the sheet metal plates that contain the lock mechanism and protect the same. It will be seen that the depressed portion in the bolt receiving arm prevents any tampering with the bolt while the same is positioned within the said receiving arm, and that by having the upper and lower plates extending over the edge of the main frame, and the projecting portions along the abutting edges of the plates, extending into the other arm thus preventing any tampering with the lock mechanism.

From the foregoing description taken in connection with the accompanying drawing, the construction and mode of operation of the invention will be understood without a further extended description, changes in the form, proportions, and minor details of construction may be made within the scope of the invention without departing from the spirit or sacrificing any of the advantages thereof.

What we claim is:—

1. In a lock for control pedals, a main frame, a pair of arms pivotally secured thereto, plates carried by the arms to engage the pedals, and means provided to hold the arms in a locked position.

2. In a lock for control pedals, a main frame, a pair of arms pivotally secured thereto, plates carried by the said arms, the said plates being provided with slots to receive the pedals, and means provided to hold the arms in a locked position.

3. In a lock for control pedals, a main frame, a pair of arms pivotally secured thereto, plates carried by one of said arms adapted to contain a lock mechanism, and plates carried by the other arm adapted to receive the bolt of the lock mechanism to hold the arms in a locked position.

4. In a lock for control pedals, a main frame, a pair of arms pivotally secured thereto, plates carried by the said arms, the said plates being adapted to lie between the pivoted arms and the main frame when the arms are in a locked position, and means provided to hold the arms in a locked position.

5. In a lock for control pedals, a main frame, a pair of arms pivotally secured thereto, plates carried by and secured to said arms and arranged to extend over the edge of the main frame when the arms are arranged in a locked position, and means provided to hold the arms in a locked position.

6. In a lock for control pedals, a main frame, a pair of arms pivotally secured thereto, the said arms having their free ends angled, plates carried by the arms and having their edges angled correspondingly to the angle of the said arms, and means provided to hold the arms in a locked position.

7. In a lock for control pedals, a main frame, a pair of arms pivotally secured thereto, plates carried by the said arms and rigidly secured thereto, the plates of one arm being depressed on their upper and lower faces respectively of the upper and lower plates in a direction toward each other and securely fastened together, and means provided for holding the arms in a locked position.

8. In a lock for control pedals, a main frame, a pair of arms pivotally secured thereto, plates carried by the said arms, the plates of one arm being provided with a projecting portion adapted to be received by the body of the other when the arms are arranged in a locked position, and means provided for holding the arms in a locked position.

9. In a lock for control pedals, a main frame, a pair of arms pivotally secured thereto, plates carried by and rigidly secured to the said arms, the plates of one arm being provided with offset projecting portions and adapted to be received by the body of the other arm when the device is arranged in a locked position, the said projecting portion being offset a distance a little greater than the thickness of the plates, and means provided for holding the arms in a locked position.

10. A lock for control pedals, comprising a main frame provided with laterally extending hinge members at the extremities thereof, two pivotally connected arms carried by the hinge members of the main frame, said arms being provided with laterally extending hinge members to co-act with the hinge members of the main frame, upper and lower plates carried by each arm and provided with elongated slots adjacent the hinge members, said slots being adapted to receive the pedals, the plates of one arm being adapted to receive the bolt of a lock mechanism, the plates of the other arm being adapted to contain a lock mechanism to lock the arms in a closed position.

In testimony whereof we affix our signatures in presence of two witnesses.

CHARLES TAYLOR HARDING.
EUGENE W. HARDING.

Witnesses:
HARRY W. SANFORD,
ELMER L. SIDLE.

Copies of this patent may be obtained for five cents each, by addressing the "Commissioner of Patents, Washington, D. C."